Patented Jan. 6, 1931

1,787,585

UNITED STATES PATENT OFFICE

IRA G. McBETH AND JOHN R. ALLISON, OF WHITTIER, CALIFORNIA, ASSIGNORS TO LEFFINGWELL RANCHO COMPANY, OF WHITTIER, CALIFORNIA, A CORPORATION OF CALIFORNIA

INSECTICIDE AND FUNGICIDE

No Drawing. Application filed February 25, 1927. Serial No. 171,065.

This invention relates to insecticides and fungicides, and is more particularly related to a compound for improving and extending the use of insecticides and fungicides.

The remarkable increase in insect pests on agricultural crops during the past few years has made necessary the improvement of methods of control of these insect pests. Not only have the pests increased in number and variety, but the territory infected has grown yearly. In many instances, control measures which were heretofore used have now become no longer effective to give relief. The use of mineral oil in combination with sulfur has been used with considerable success in some instances in combatting these insect pests. Certain oil emulsions, particularly soap emulsions, have been used in combination with sulfur but are deficient in stability. The sulfur attacks the emulsifying agent and liberates the oil. When such combinations are used, it has been practice to add certain materials to bring about a more stabilized condition. One common form of stabilizing material has been casein which has been used in combination with lime to render the same soluble. The addition of lime to the insecticide or fungicide, as the same is used for a spray material, is objectionable because of the abrasive action of the lime on the spray machinery, the formation of spots on the fruit and, in some instances, the presence of lime reacts injuriously upon the spray material.

It is, therefore, an object of this invention to provide an insecticide or fungicide which includes a compound of the water soluble nitrogenous substance of the protein group, which renders the stabilizing compound material available and does away with the necessity of employing lime, thereby eliminating the corrosive effect of the sprays as heretofore used upon the spraying machinery and also provides a compound which will not form upon fruit spots which are difficult to remove and will not act injuriously upon the spray material.

Another object of this invention is to provide a fungicide or insecticide spray which includes a compound of the water soluble nitrogenous substance of the protein group at a relatively low cost.

Another object of this invention is to provide a fungicide or insecticide oil emulsion spray which includes a spreader and stabilizer including a water soluble nitrogenous substance of the protein group.

Another object of this invention is to provide a fungicide or insecticide including an oil emulsion and a spreader including a water soluble nitrogenous substance of the protein group and a preserving material for the said nitrogenous substance of the protein group.

Other objects of this invention, it is believed, will be apparent from the following detailed description thereof.

We have discovered that if a nitrogenous substance of the protein group and which is water soluble is added to the customary oil and sulfur spray, a spray will be formed which is stable and which gives to the spray the characteristic of spreading easily upon the leaves and fruit of the trees or vegetation desired sprayed, overcoming the surface tension of the material to be sprayed and making possible a smooth even coating of the spray material and prevents the excessive absorption of the oil by the foliage, the excessive building up of the oil film, and is of material assistance in the stabilizing of the emulsion so that free oil is not liberated in the spray tank.

This invention contemplates the use of any water soluble nitrogenous substance of the protein group, for example, such compounds as are manufactured from blood and sold under the trade names of blood albumen, special dried blood, sprayed dried blood flour, etc.

In accordance with this invention, 50 pounds of dried blood albumen are added to 50 gallons of water to which two gallons of 26° aqua ammonia has been added. The albumen is added to the ammonia solution and allowed to soak for several hours without stirring. This prevents the albumen forming into lumps. The use of luke warm water hastens the solubility of the albumen but is not necessary. The spreader thus provided is added to any suitable form of spray materials such as are commonly employed, for example, such as a mixture of oil, water and sulfur, to provide a spray for use as an insecticide and fungicide. The material is also added to powdered lead arsenate which has been extensively used as a spray for biting insects, and overcomes the difficulty which has heretofore been had with the use of such powdered lead arsenate, first, in that the lead arsenate when added to water ordinarily has a tendency to flocculate forming into small lumps which is extremely undesirable from the standpoint of securing an even spread of the material over the sprayed surface and, second, provides a spray which solves the surface tension problem allowing the spray material to form a smooth even coating over the foliage or material to be sprayed.

The spray material as prepared as hereinbefore set forth is added to the spray either of the lead arsenate or the oil sulfur emulsion type in approximately the quantity of one quart of spreader containing the nitrogenous substance of the protein group to each 100 gallons of water and has been found sufficient to produce the desired results. The quantity, however, may be varied to meet the individual requirements of each spray and as desired by the user thereof.

Having described our invention, it is understood that we do not wish to be limited to the details herein set forth which may be varied without departing from the spirit of our invention as defined by the appended claims.

We claim:

1. A composition of matter including a spray material, a water soluble nitrogenous substance of the protein group, and a preserving material for the said member of the protein group.

2. A composition of matter including a spray material, a water soluble nitrogenous substance of the protein group and a small quantity of ammonia.

3. A solution adapted for use as a spreader and stabilizing agent for oil and surface sprays including a water solution of a nitrogenous substance of the protein group to which ammonia has been added.

4. In a compound of the class described, the combination of a spreader including a water solution of ammonia and a nitrogen compound of the protein group.

5. An insecticide and fungicide containing oil and water emulsion and a stabilizing and spreading material including a water soluble nitrogenous substance of the protein group in an aqueous solution containing ammonia.

6. A compound adapted for use as a spreader and stabilizing agent for oil spraying mixtures comprising a nitrogenous substance of the protein group dissolved in a diluted ammonia solution.

Signed at Whittier, California, this 15 day of February, 1927.

IRA G. McBETH.
JOHN R. ALLISON.